United States Patent [19]
Pflager et al.

[11] Patent Number: 5,443,413
[45] Date of Patent: Aug. 22, 1995

[54] BRUSHLESS SPINDLE MOTOR FOR A GRINDING MACHINE INCLUDING HYDROSTATIC BEARINGS

[75] Inventors: William W. Pflager, Waynesboro; Timothy W. Hykes, Greencastle, both of Pa.

[73] Assignee: Western Atlas Inc., Paramus, N.J.

[21] Appl. No.: 99,588

[22] Filed: Jul. 30, 1993

[51] Int. Cl.6 .................................. B24B 49/00
[52] U.S. Cl. ............................... 451/11; 451/7; 451/294; 310/68 B; 310/90
[58] Field of Search ............... 51/134.5 R, 134.5 F, 51/322, 266, 165.9, 165.73, 165.71, DIG. 7, DIG. 16; 310/90, 54, 67 R, 68 B

[56] References Cited

U.S. PATENT DOCUMENTS

| | | | |
|---|---|---|---|
| 3,089,046 | 5/1963 | Jaeschke | 310/54 |
| 3,596,121 | 7/1971 | Chang | 310/166 |
| 4,180,946 | 1/1980 | Heijkenskjold et al. | 51/134.5 R |
| 4,294,045 | 10/1981 | Enomoto et al. | 51/165.71 |
| 4,474,483 | 10/1984 | Suzuki et al. | 384/114 |
| 4,712,031 | 11/1986 | Anderson | 310/90 |
| 4,952,830 | 8/1990 | Shirakawa | 310/68 B |
| 5,027,280 | 6/1991 | Ando et al. | 364/474.16 |
| 5,070,264 | 12/1991 | Conrad | 310/68 B |
| 5,205,078 | 4/1993 | Takara et al. | 51/165.77 |

Primary Examiner—Maurina T. Rachuba
Attorney, Agent, or Firm—Mitchell B. Wasson; Martin P. Hoffman; Morris I. Pollack

[57] ABSTRACT

A grinding machine provided with a spindle rotating under the influence of a cantilever mounted rare earth permanent magnet motor. Hydrostatic fluid film bearings are provided between the ends of the spindle and a bronze bearing to support the spindle in such a manner so as to eliminate wear. A single oil reservoir is used to supply oil to the hydrostatic bearings, as well as to the cooling jacket of the motor.

13 Claims, 4 Drawing Sheets

BRUSHLESS SPINDLE MOTOR FOR A GRINDING MACHINE INCLUDING HYDROSTATIC BEARINGS

BACKGROUND OF INVENTION

1. Field of the Invention

The present invention is directed to a grinding machine for finishing camshafts, crankshafts, or similar workpieces.

2. Prior Art

Grinding machine spindles have traditionally been driven by belts from induction motors or direct current (DC) motors. A major drawback utilizing these prior art motors is the fact that belts must be used to rotate a grinding wheel and spindle. Belt forces imposed upon the spindle result in belt wear and contamination as well as velocity limitations, mechanical inefficiencies, as well as vibrations. Although these belt drives do benefit from low manufacturing costs and simple electrical control, these types of belt drives are detrimental, since they are noisy and wear out at speeds in excess of 3000 rpm.

SUMMARY OF THE INVENTION

The present invention overcomes the deficiencies of the prior art by utilizing a permanent magnet brushless motor to power the wheel spindle of a grinding machine, This permanent magnet motor occupies less space than the prior art induction motors for a given horsepower and the rotor of the motor does not generate as much heat as generated by the induction motor. Hydrostatic film bearings are provided between the spindle and the wheelbase casing of the grinding machine, The same fluid used as the hydrostatic film bearing which removes heat from the rotating spindle is circulated through the motor cooling jacket. This helps to maintain a minimum temperature gradient throughout the mechanical system. If significant thermal differences existed between mechanism parts, bearing clearances could disappear or the wheelhead would distort.

Additionally, the permanent magnet motor of the present invention is mounted cantilevered over the spindle bearing, thereby simplifying the assembly. Furthermore, this configuration would allow the motor to operate in an environment free of oil mist produced by the bearings.

BRIEF DESCRIPTION OF THE DRAWINGS

Other objects, features and advantages of the invention will be readily apparent from the following description of certain preferred embodiments taken into conjunction with the accompanying drawings, wherein like reference characters indicate like or corresponding parts, although variations and modifications may be effected without departing from the spirit and scope of the novel concepts of the disclosure and in which.

DETAIL DESCRIPTION OF THE PREFERRED EMBODIMENT

Figure 1:
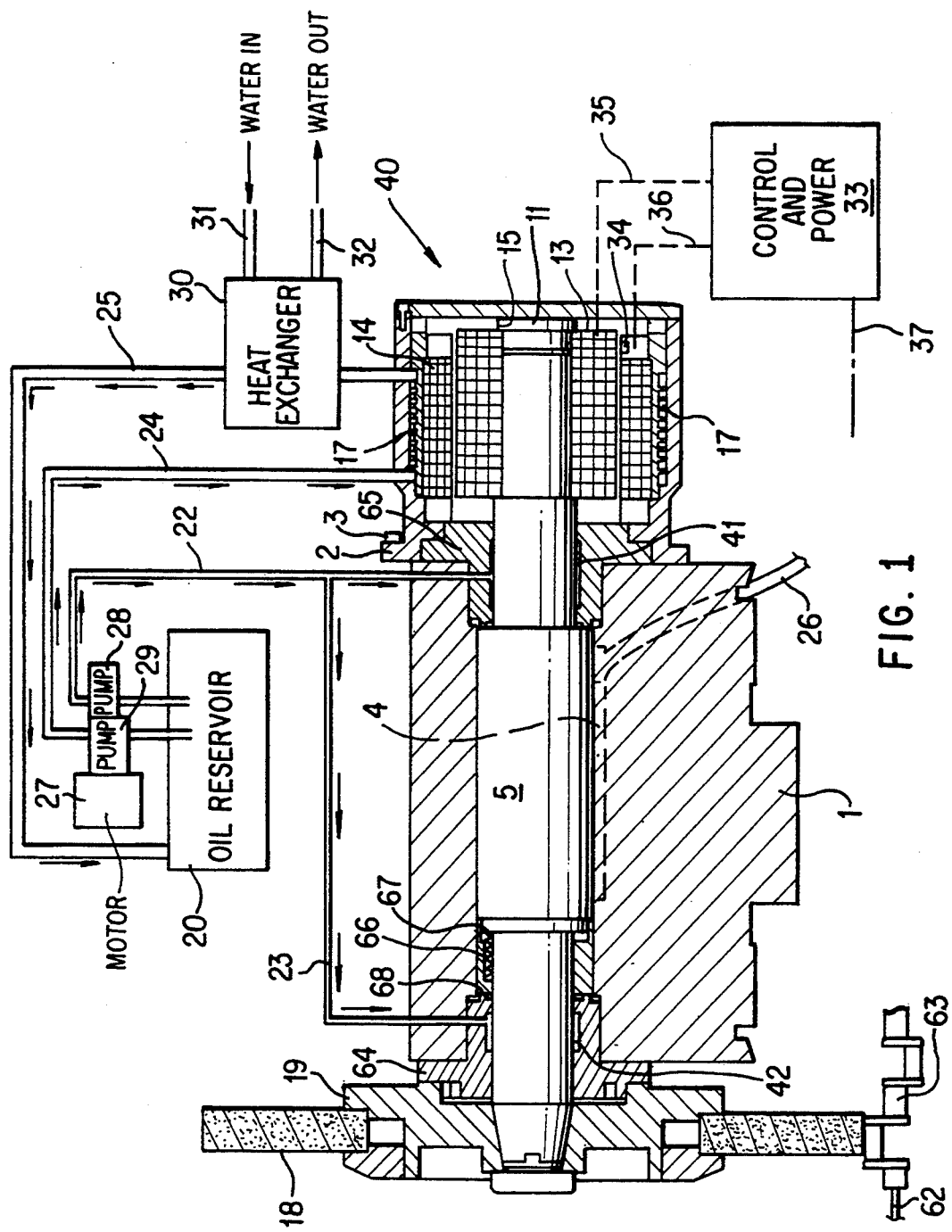
FIG. 1 is a sectional view of the motor mounted onto the spindle including a diagram showing the flow of cooling material through the mechanism.
Figure 2:
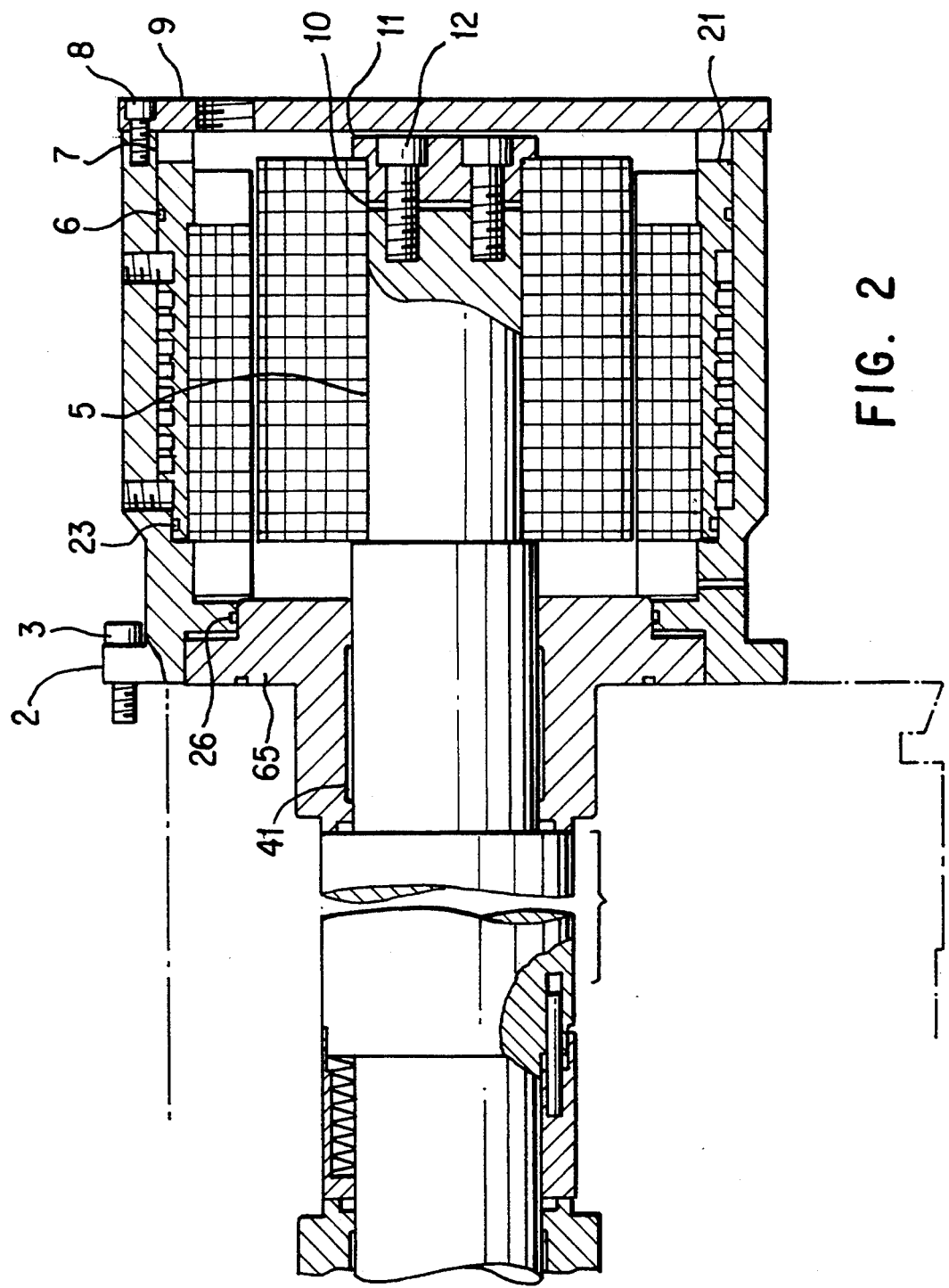
FIG. 2 is a side sectional view of the grinding wheel mechanism showing the mounting of the motor to the grinding spindle.
Figure 3:
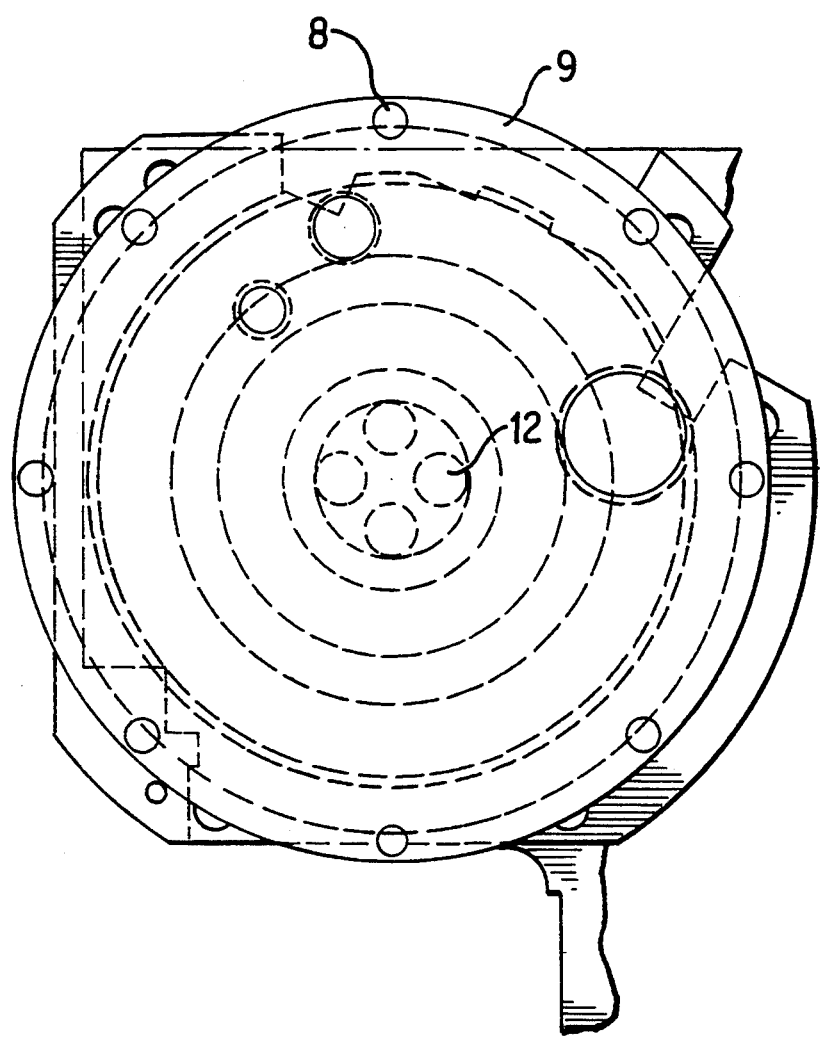
FIG. 3 is an end view of the machine shown in FIG. 2.

FIG. 1, FIG. 2 and FIG. 3 illustrate the mechanical configuration of the grinding wheel and motor according to the present invention. The machine as shown in the drawings, is provided with a wheelbase 1 and is supported by a base or a bed (not shown). A grinding wheel 18 is mounted to a rotating spindle 5 utilizing a mounting flange 19. The grinding wheel is used to grind the outer of surfaces of workpieces 63, such as lobes, on crankshafts, camshafts, or similar devices. However, it should be noted that the present invention could be utilized to grind the inner surfaces of various workpieces. The workpieces are supported by a support device 62 mechanisms and provided to move the grinding wheel, both up and down and front and back with respect to the workpiece 63.

A frameless, rare-earth, permanent magnet motor 40 is mounted in a cantilever fashion to the spindle 5. The motor includes a rotating rotor 13 as well as a stator 14 which is provided in a motor frame 2 attached to the grinding machine mechanism utilizing a plurality of screws 3. A circular end cap 9 is affixed to the motor frame 2 by a plurality of screws 8. The rotor 13 is axially clamped to the spindle 5 by a retainer clamp 11 having shoulder 15. The spindle 5 is attached to this retainer clamp 11 by a plurality of screws 12. The spindle 5 also includes a shoulder 16, which with the assistance of the shoulder 15 applies the rotation of the rotor 13 to the spindle 5. A spacer 10 is provided between the retainer clamp 11 and one end of the spindle 5. Springs 66 provide a thrust loading between shoulders 67, 68, of the spindle 5.

A stator sleeve 21 surrounds the outer periphery of the motor and is provided with a labyrinth 17 through which fluid, such as oil flows to cool the motor. This oil flow is pumped through pump 29 powered by a motor 27 from an oil reservoir 20 through line 24 to the labyrinth 17. This oil, now at an elevated temperature, flows out from the labyrinth 17 through a line 25 to a heat exchanger 30 which reduces the temperature of the oil. Shown in FIG. 1, fluid lines 31 and 32 are used to direct fluid such as water to and from the heat exchanger 30 for cooling the oil. However, it should be noted that the exact type of heat exchanger utilized is not important and virtually any cooling medium and heat exchanger can be employed.

Hydrostatic fluid film bearings 41, 42 are provided between the spindle 5 two immobile bronze bearings 64, 65. Each of the bearings is provided in four pockets, which surround the wheel spindle. One of the bearings is provided close to the anterior end of the spindle 5 near the grinding wheel mounting flange 19, and the second bearing is provided near the posterior end of the spindle near the motor 40. These bearings consist of oil and are supplied by the same oil reservoir 20 which supplies oil to the cooling jacket labyrinth 17. Motor 27 powers a pump 28 for pumping the oil through lines 22 and 23 to the bearings 41, 42. Oil will then flow through a drain cavity 4 provided in the wheelbase casing. This oil will then flow through drain line 26 and back to the oil reservoir 20. It can be appreciated, that since the same oil is supplied from reservoir 20 to both the labyrinth 17 as well as the hydrostatic bearings 41, 42, only a single heat exchanger 30 need be utilized. This particular configuration would maintain the oil at a temperature between ambient and approximately 150 degrees Fahrenheit. Additionally, it should be noted that the type of oil which is employed is not crucial to the present invention. One such oil that can be employed is Mobil DTE11 spindle oil.

Figure 4:
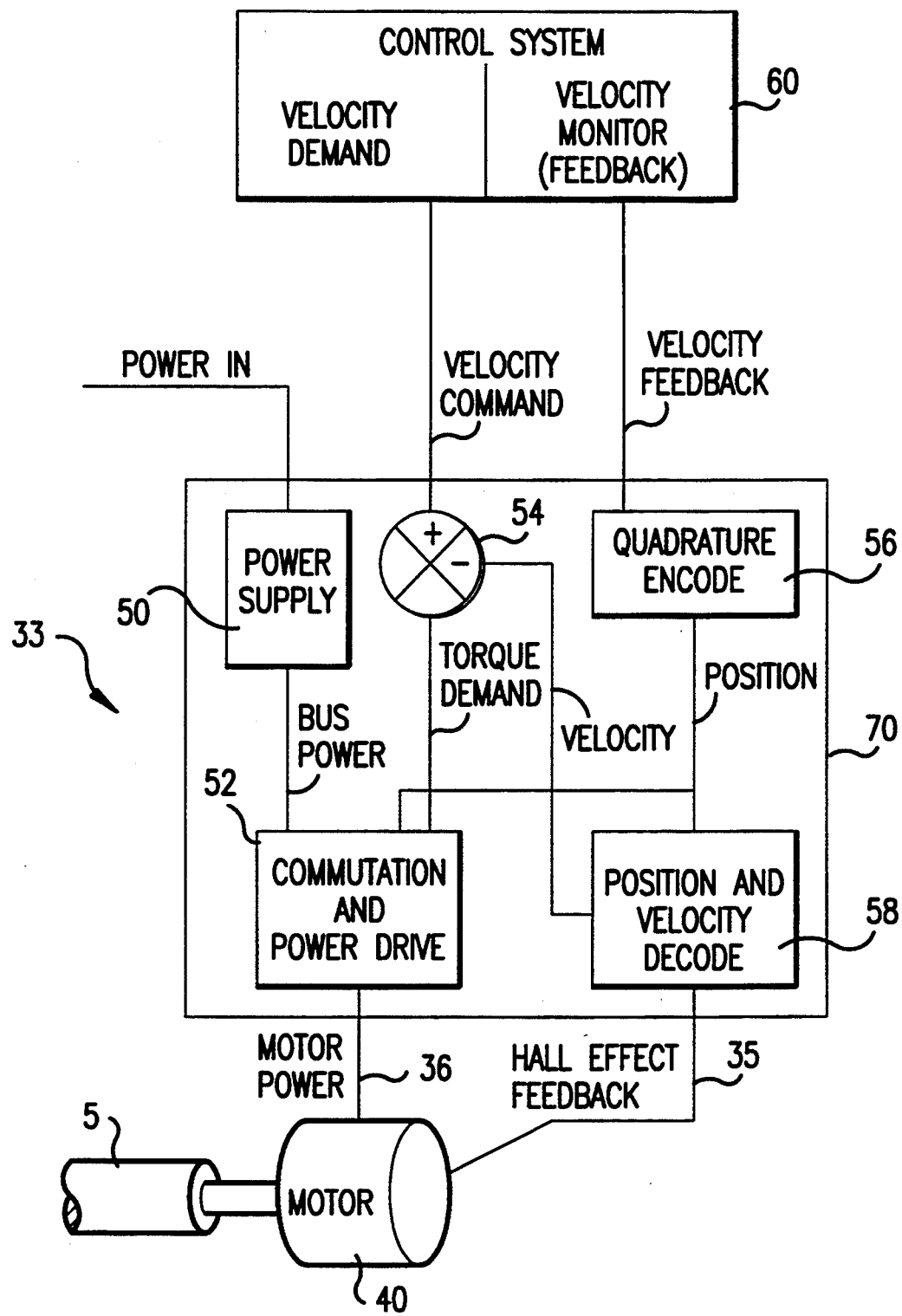
FIG. 4 is a diagram of the mechanism for controlling the rotation of the motor.

FIG. 4 shows a block diagram controlling the operation of the motor 40. As noted by the control and power section 33 illustrated in FIG. 1, a three phase line power signal 37 is used to power the motor 40 and the grinding machine. The position of the rotor 13 is determined utilizing a plurality of Hall effect device sensors 34 affixed to the stator 34 in a radial direction. Although the exact number of Hall effect devices is not crucial, it has been found that the present invention operates particularly well with ten of the Hall effect devices 34. These Hall effect devices would measure the position of the rotor 13 with respect to the stator 14. This position information is transmitted to the control and power section 33 via bus 35 and is used to calculate the correct Velocity of the rotor as well as the commutation information necessary to correctly operate the motor 40.

The control and power section 33 is provided with a first section 70 which controls the input and output of electric signals to the motor 40 and a second section 60 which constantly compares the calculated actual velocity signal of the rotor 13 with the projected velocity signal. A power supply circuit 50 which rectifies and filters the incoming three phase power to provide low level logic power and high voltage DC power is included in first section 70. Power and command signals are provided over a bus 36 to the motor 40, based upon information received by the commutation and power drive section 52, which in turn processes motor rotor position information received from the Hall effect devices 34 and a torque command control 54. This torque demand is determined by comparing the actual velocity of the rotor 13 as determined by a position and velocity decode section 58 based upon the position of the rotor as sensed by the Hall effect devices 34. A position and velocity decode section 58 converts the Hall effect device input into a motor rotor position as well as a motor velocity signal. A quadrature encoder section 56 converts the position of the rotor as determined by the position and velocity decode section 58 into a quadrature encoder type output which is used as a feedback velocity by a control section 60. The control section 60 provides a velocity command to the control and power section 33. This signal is presently a zero and ten volt signal proportional to the required velocity of the rotor. The control system also monitors the grinding wheel spindle velocity from the quadrature signal provided by the quadrature encoder 56. Although the particular control system of the present invention employs analog inputs and outputs, a digitally controlled system could also be implemented in which both the command and feedback signals generated by the control system 60 would be communicated over a digital serial interface.

The invention has been described with reference to the illustrated and presently preferred embodiments. It is not intended that the invention be unduly, limited by this disclosure of the presently preferred embodiment. Instead, it is intended that the invention be defined by the means, and their obvious equivalents, as set forth in the following claims.

What is claimed:

1. A grinding machine comprising:
   a rotating elongated spindle provided with a first end and a second end;
   a rotating grinding wheel connected to said first end of said elongated spindle;
   a means for holding a workpiece proximate to said rotating grinding wheel;
   a permanent magnet motor including a rotatable rotor provided within a stationary stator, said rotor directly clamped over said second end of said elongated spindle and;
   control means connected to said permanent magnet motor for controlling the rotation of said rotor;
   whereby rotation of said rotor directly forces said elongated spindle to rotate.

2. The grinding machine in accordance with claim 1, wherein said permanent magnet motor is clamped to said second end of said elongated spindle.

3. The grinding machine in accordance with claim 1, wherein said control means includes a plurality of Hall effect sensors affixed to said stator for sensing the position of said rotor, a means for calculating the actual velocity of said rotor based upon the position of said rotor sensed by said Hall effect sensors, a means of comparing the actual velocity of said rotor with the projected velocity of said rotor, and means for controlling the velocity of said rotor based upon the difference between the actual velocity of said rotor and the projected velocity of said rotor.

4. A grinding machine comprising:
   a rotating elongated spindle provided with a first end and a second end;
   first and second immovable bearings, each bearing encircling a portion of said first end or said second end of said elongated spindle;
   a rotating grinding wheel connected to said first end of said elongated spindle;
   a means for holding a workpiece proximate to said rotating grinding wheel;
   a motor affixed to the grinding machine and cooperating with said elongated spindle to provide rotation thereto, said motor provided with a liquid cooling jacket for cooling said motor;
   hydrostatic film bearings provided between said first and second immovable bearings and a portion of said first end and said second end of said elongated spindle for protecting said elongated spindle from wear;
   a liquid reservoir; and
   a closed system including a plurality of feed lines for feeding liquid from said liquid reservoir to said hydrostatic bearings and said liquid cooling jacket of said motor, said closed system further including return lines from said hydrostatic bearings and said cooling jacket of said motor to said liquid reservoir.

5. The grinding machine in accordance with claim 4, wherein said closed system further includes a liquid cooled heat exchanger.

6. The grinding machine in accordance with claim 5, wherein said heat exchanger is water cooled and is provided in said return line between said liquid cooling jacket of said motor and said liquid reservoir.

7. The grinding machine in accordance with claim 4, wherein a single liquid reservoir is included.

8. The grinding machine in accordance with claim 4 wherein said motor is a permanent magnet motor including a rotatable rotor provided within a stationary stator, said rotor directly clamped over said second end of said elongated spindle.

9. The grinding machine in accordance with claim 7 wherein said motor is a permanent magnet motor including a rotatable rotor provided within a stationary stator, said rotor directly clamped over said second end of said elongated spindle.

10. The grinding machine in accordance with claim 8 where said liquid reservoir is filled with oil.

11. The grinding machine in accordance with claim 9, wherein said single liquid reservoir is filled with oil.

12. The grinding machine in accordance with claim 4 wherein said motor is a permanent magnet motor including a rotatable rotor provided within a stationery stator, said rotor directly clamped over said second end of said elongated spindle.

13. The grinding motor in accordance with claim 12, wherein said liquid cooling jacket encircles said stator.

* * * * *